(12) United States Patent
Alecu

(10) Patent No.: US 12,313,009 B2
(45) Date of Patent: May 27, 2025

(54) COUPLING AND ASSOCIATED METHOD OF TRANSFERRING TORQUE

(71) Applicant: PRATT & WHITNEY CANADA CORP., Longueuil (CA)

(72) Inventor: Daniel Alecu, Brampton (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 18/947,746

(22) Filed: Nov. 14, 2024

(65) Prior Publication Data
US 2025/0067221 A1 Feb. 27, 2025

Related U.S. Application Data

(62) Division of application No. 18/304,081, filed on Apr. 20, 2023, now Pat. No. 12,173,659.

(51) Int. Cl.
*F02C 7/36* (2006.01)
*F16D 3/76* (2006.01)

(52) U.S. Cl.
CPC .............. *F02C 7/36* (2013.01); *F16D 3/76* (2013.01); *F16D 2250/0023* (2013.01); *F16D 2250/0084* (2013.01); *F16D 2300/12* (2013.01)

(58) Field of Classification Search
CPC ...... F02C 7/36; F16D 3/76; F16D 2250/0023; F16D 2250/0084; F16D 2300/12; F16D 3/60; Y10T 403/1624; Y10T 403/61; F01D 25/28; F01D 25/285; F05D 223/064; F05D 2230/644; F05D 2230/68; F05D 2230/60; B23P 19/04; B23P 19/10; B23P 19/12

See application file for complete search history.

(56) References Cited

U.S. PATENT DOCUMENTS

| | | | |
|---|---|---|---|
| 2,096,039 A | 10/1937 | Higgins |
| 2,737,033 A | 3/1956 | Bendall |
| 2,970,019 A | 1/1961 | Brown et al. |
| 3,712,434 A | 1/1973 | Anderson et al. |
| 4,098,096 A | 7/1978 | Chard et al. |
| 4,357,137 A | 11/1982 | Brown |
| 5,173,822 A | 12/1992 | Kuriyama et al. |

(Continued)

FOREIGN PATENT DOCUMENTS

| | | |
|---|---|---|
| EP | 2169245 A1 | 3/2010 |
| FR | 482921 A | 5/1917 |

(Continued)

*Primary Examiner* — Aaron R Eastman
(74) *Attorney, Agent, or Firm* — NORTON ROSE FULBRIGHT CANADA LLP

(57) ABSTRACT

The coupling can have a female member having a plurality of female member connections circumferentially arranged along a radially inner face; a male member having a plurality of male member connections circumferentially arranged along a radially outer face; and a coupling member extending annularly around the axis, the coupling member having a strip, the strip having, circumferentially relative the axis, an alternating sequence of outer folds and inner folds, the outer folds connected to the female member via respective ones of the female member connections, the inner folds connected to the male member via respective ones of the male member connections, the inner folds being circumferentially offset from the outer folds in a given angular direction.

5 Claims, 7 Drawing Sheets

(56) References Cited

U.S. PATENT DOCUMENTS

| | | | |
|---|---|---|---|
| 5,573,461 | A | 11/1996 | Colford |
| 6,843,727 | B2 | 1/2005 | Counter et al. |
| 7,691,028 | B2 | 4/2010 | Hattenbach et al. |
| 7,763,336 | B2 | 7/2010 | Clarke et al. |
| 7,980,956 | B2 | 7/2011 | Kneeshaw et al. |
| 9,529,315 | B1 | 12/2016 | Kawai et al. |
| 10,837,496 | B2 | 11/2020 | Kowalewski et al. |
| 11,401,870 | B2 | 8/2022 | Alecu et al. |
| 11,767,885 | B2 * | 9/2023 | Shields ............... F16D 3/62 464/152 |
| 2008/0009354 | A1 | 1/2008 | Hodjat et al. |
| 2016/0298603 | A1 | 10/2016 | Guern et al. |

FOREIGN PATENT DOCUMENTS

| | | |
|---|---|---|
| FR | 855064 A | 5/1940 |
| FR | 1446757 A | 7/1966 |
| GB | 191125322 A | 8/1912 |

\* cited by examiner

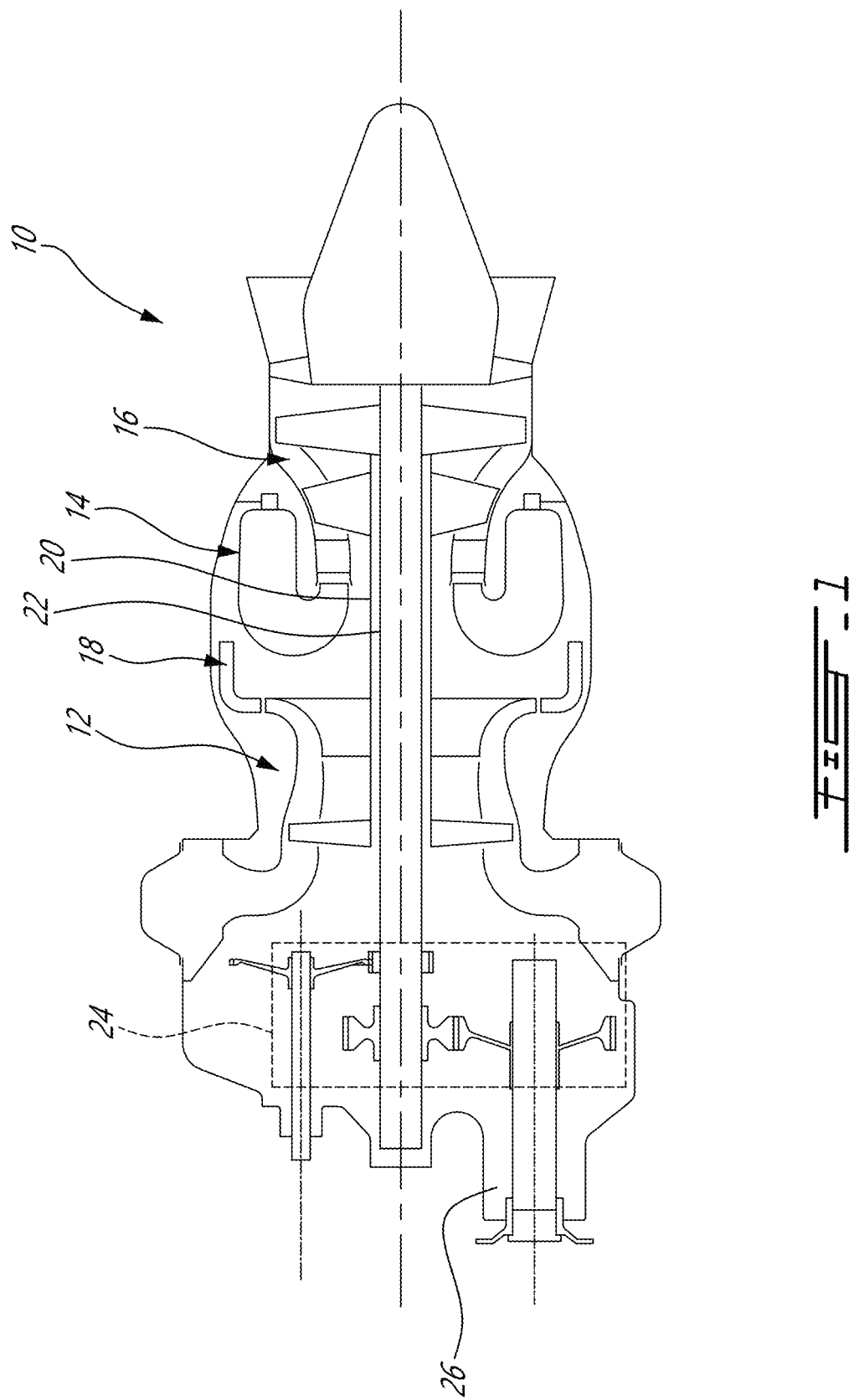

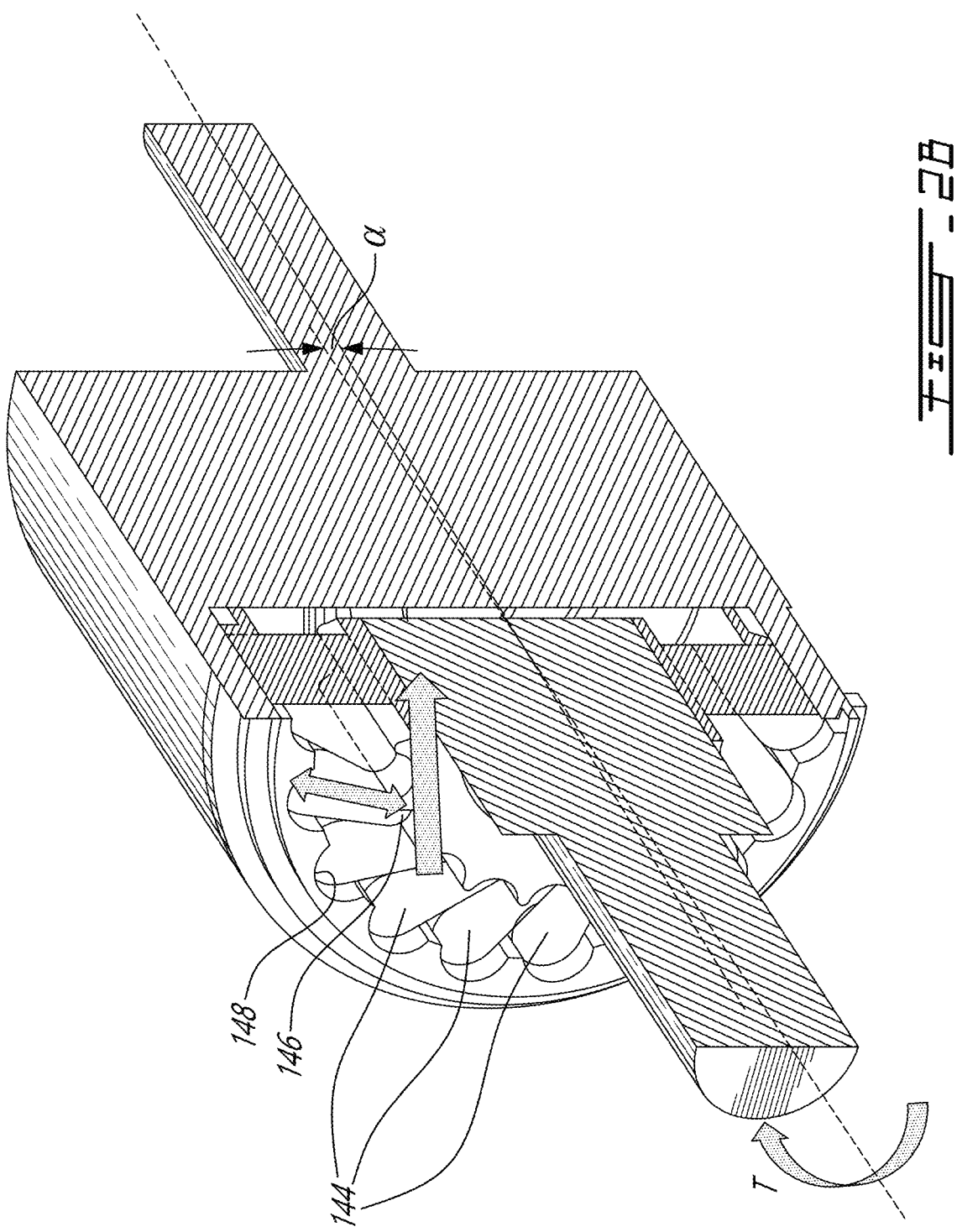

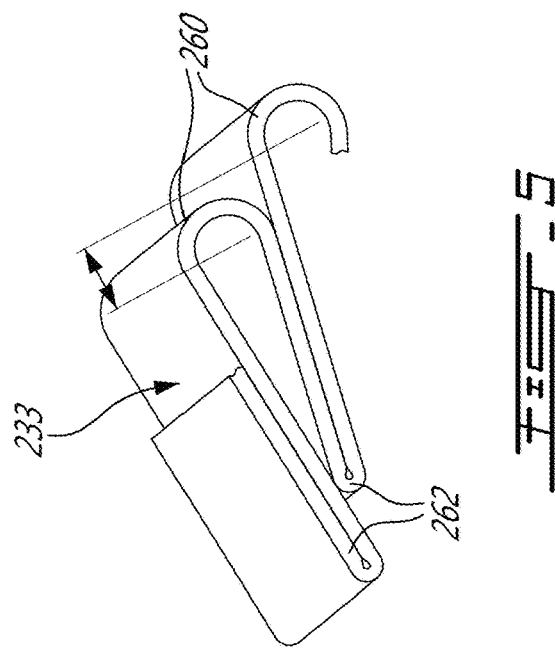
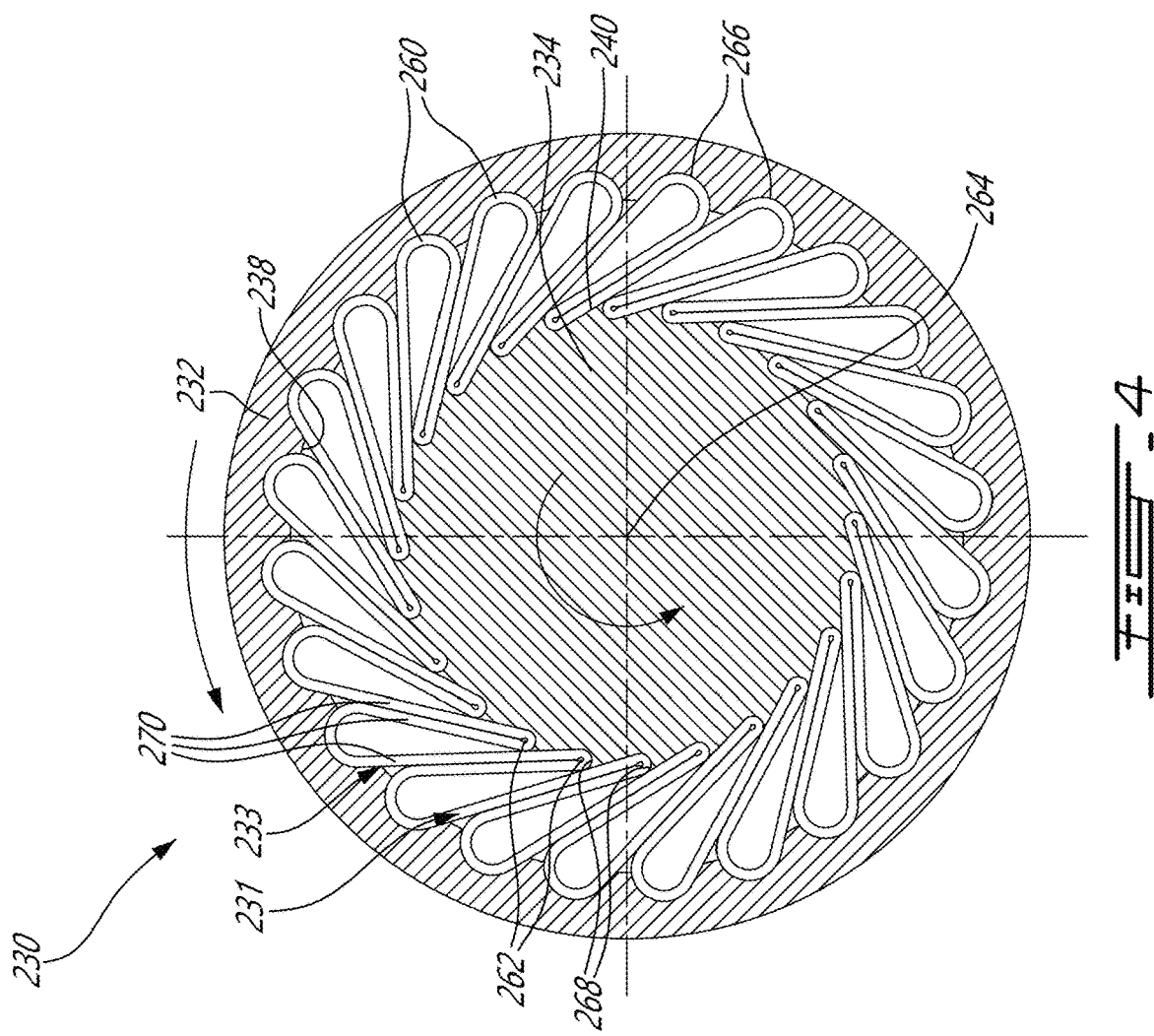

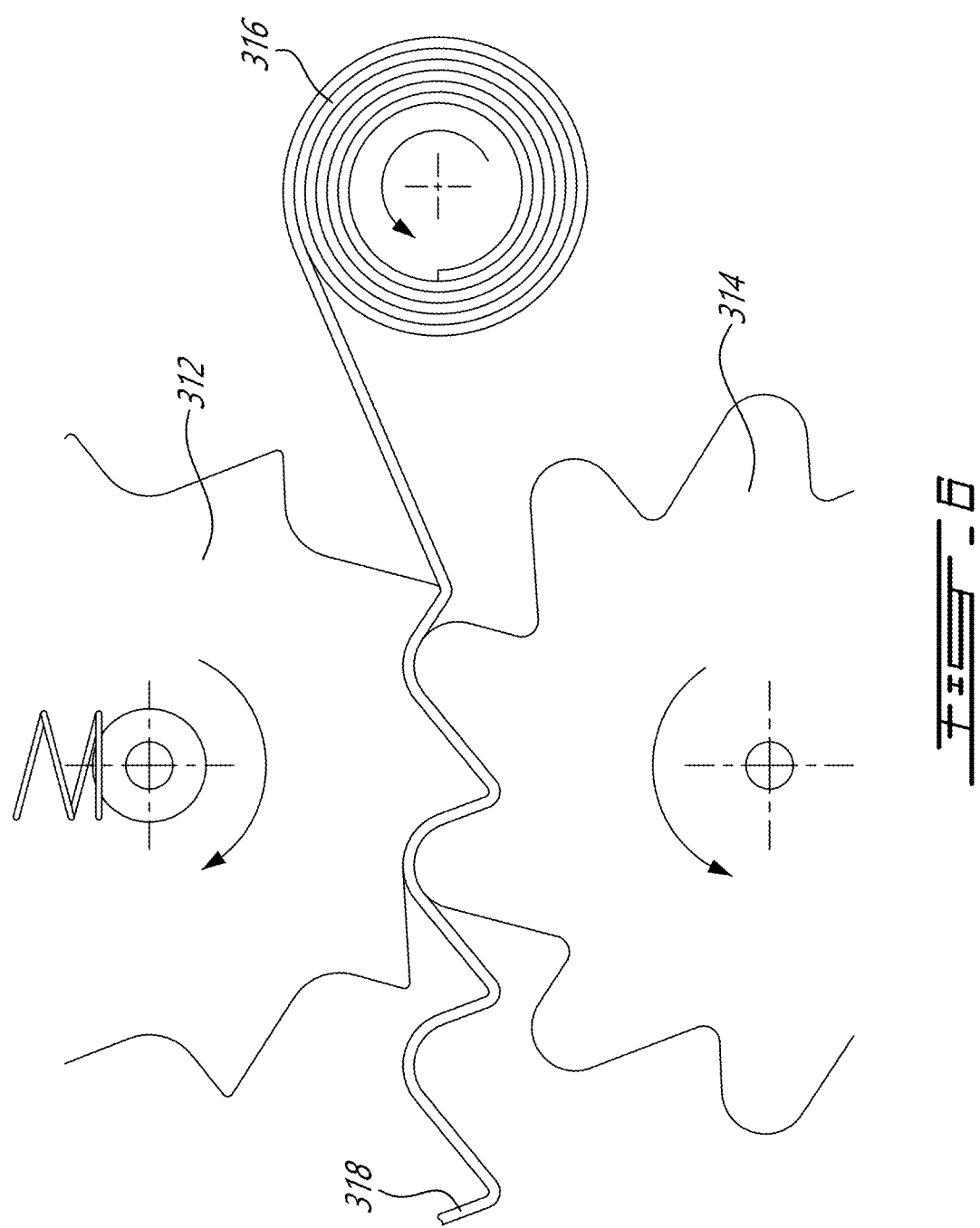

COUPLING AND ASSOCIATED METHOD OF TRANSFERRING TORQUE

CROSS-REFERENCE TO RELATED APPLICATIONS

The application is a divisional of patent application Ser. No. 18/304,081 filed on Apr. 20, 2024, the entire contents of which are incorporated by reference i.

TECHNICAL FIELD

The application relates generally to a coupling which can be used to transfer torque between components.

BACKGROUND OF THE ART

Couplings are used in a wide variety of applications to transfer torque from one rotary component (such as a shaft) of one piece of equipment to a rotary component of another. Common considerations in coupling design include achieving satisfactory dynamic stress resistance and low friction in operating conditions varying across the operation envelope, as well as limiting costs, which includes manufacturing, assembly, and maintenance costs. Achieving low friction may use lubrication in some embodiments, and satisfying some portions of the operation envelope may use cooling, either of which may be associated to inconveniences from the design, manufacturing, or maintenance perspective. In aeronautic applications, minimizing weight is also typically a significant design consideration. Individual pieces of equipment can be manufactured separately. Many couplings involve aligning the axes of the two rotary components within a certain degree of tolerance, to a point which can be difficult or challenging to achieve in practice, and increasing the degree of tolerance to misalignment has represented significant trade-offs or sacrifices on at least some of the design considerations. There always remains room for improvement, such as improving manufacturability and/or ease of assembly.

SUMMARY

In one aspect, there is provided a coupling comprising: a female member rotatable around an axis, defining an axial recess bounded by a radially inner face, and having a plurality of female member connections circumferentially arranged along the radially inner face; a male member rotatable around the axis and extending inside the axial recess and having a plurality of male member connections circumferentially arranged along a radially outer face; and a coupling member extending annularly around the axis between the female member and the male member, the coupling member having a strip, the strip having, circumferentially relative to the axis, an alternating sequence of outer folds and inner folds, the outer folds connected to the female member via respective ones of the female member connections, the inner folds connected to the male member via respective ones of the male member connections, the inner folds being circumferentially offset from the outer folds in a given angular direction.

In another aspect, there is provided a system comprising a gas turbine engine having a driving shaft, a generator having a driven shaft, and a coupling between the driving shaft and the driven shaft, the coupling comprising: a female member provided as part of one of the driving shaft and the driven shaft, the female member operable to rotate around an axis, defining an axial recess, and having a plurality of connections circumferentially arranged along a radially inner face; a male member provided as part of the other one of the driving shaft and the driven shaft, the male member extending inside the axial recess concentrically to the female member and having a plurality of connections circumferentially arranged along a radially outer face; and a coupling member extending annularly around the axis, the coupling member having a strip, the strip having, circumferentially relative the axis, an alternating sequence of outer folds and inner folds, the outer folds connected to the female member via respective ones of the female member connections, the inner folds connected to the male member via respective ones of the male member connections, the inner folds being circumferentially offset from the outer folds in a given angular direction, the given angular direction operable to subject the coupling member to compression when transmitting torque between the female member and the male member.

In a further aspect, there is provided a method of making a coupling, the method comprising: providing a band of material exhibiting plastic deformability arranged on a spool; feeding the band of material, from the spool, to a mould, the mould having two forming gears in opposition with one another and rotatably engaged with one another, with the band of material fed between the two forming gears, the forming gears thereby forming the band of material into a corrugated shape; folding summits and valleys of the corrugated shape and arranging the folded corrugated shape into an annular configuration around an axis to form a coupling member; and engaging the coupling member between a radially inner surface of a female member and a radially outer surface of a male member, with outer folds associated to folded summits of the corrugated shape engaged with corresponding connections of the female member and inner folds associated to folded valleys of the corrugated shape engaged with male member connections.

DESCRIPTION OF THE DRAWINGS

Reference is now made to the accompanying figures in which:

FIG. 1 is a schematic cross-sectional view of a gas turbine engine;

FIG. 2b is an oblique view of a coupling, in accordance with another embodiment;

FIG. 4 is a cross sectional view of a coupling, in accordance with another embodiment;

FIG. 5 is an oblique view of a portion of a strip of the coupling of FIG. 4;

FIG. 6 is a schematic view of a forming system for the strip of the coupling of FIG. 4;

DETAILED DESCRIPTION

Figure 2A:
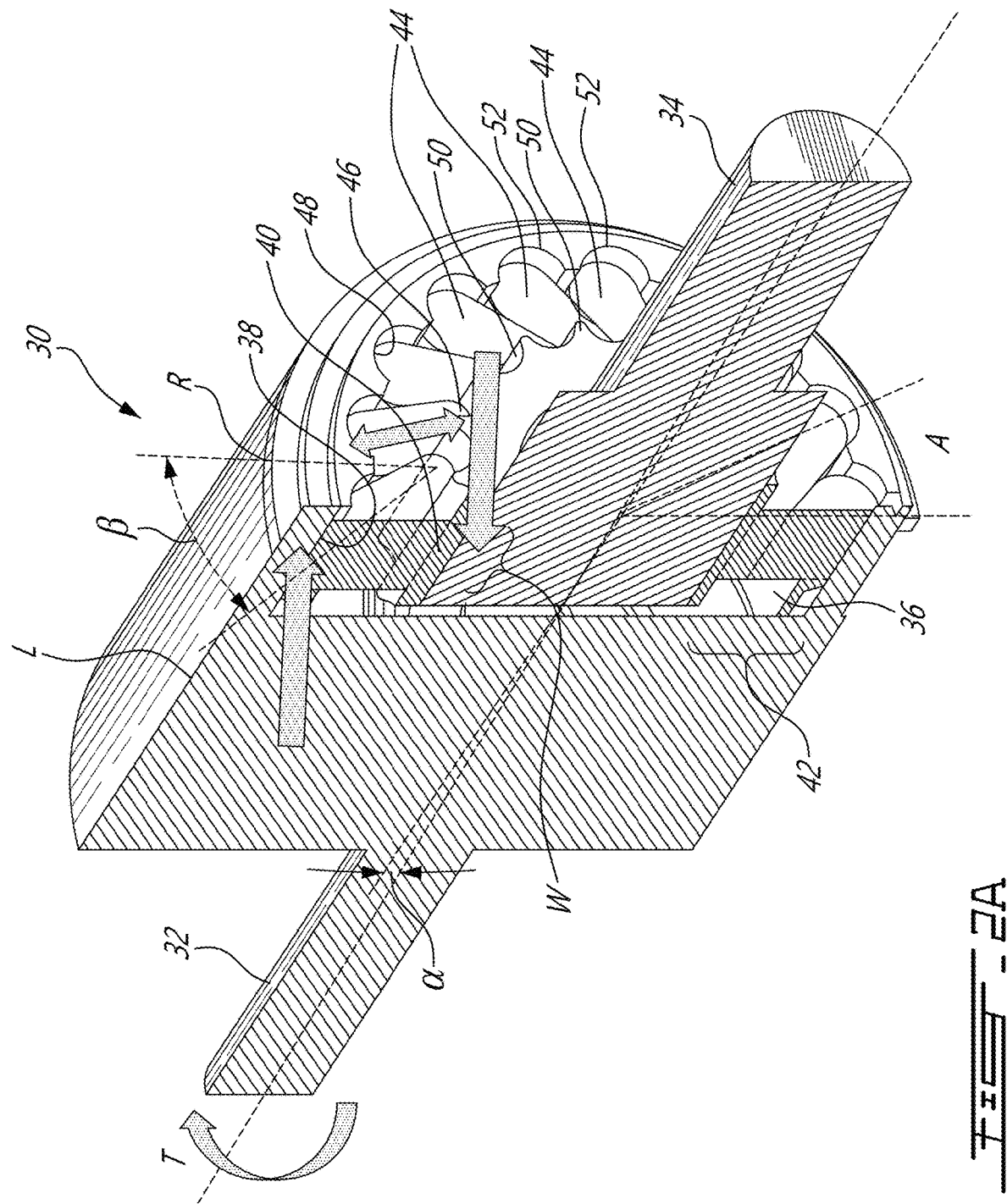
FIG. 2a is an oblique view of a coupling, in accordance with one embodiment.

FIG. 1 illustrates an example of a turbine engine. In this example, the turbine engine 10 is a turboshaft engine generally comprising in serial flow communication, a multistage compressor 12 for pressurizing the air, a combustor 14 in which the compressed air is mixed with fuel and ignited for generating an annular stream of hot combustion gases, and a turbine section 16 for extracting energy from the combustion gases. The turbine engine terminates in an exhaust section.

The fluid path extending sequentially across the compressor 12, the combustor 14 and the turbine 16 can be referred to as the core gas path 18. In practice, the combustor 14 can include a plurality of identical, circumferentially interspaced, combustor units. In the embodiment shown in FIG. 1, the turboshaft engine 10 has two compressor and turbine stages, including a high pressure stage associated to a high pressure shaft 20, and a low pressure stage associated to a low pressure shaft 22. The low pressure shaft 22 is used as a power source during use.

Turboshaft engines, similarly to turboprop engines, typically have some form of gearing by which the power of the low pressure shaft 22 is transferred to an external shaft 26 bearing the blades or propeller. This gearing, which can be referred to as a gearbox 24, typically reduces the rotation speed to reach an external rotation speed which is better adapted to rotate the blades or propeller for instance. Auxiliary power units have similarities to turboshaft and turboprop engines in that they typically have a power output shaft configured to be used as a power source, and the use of gearboxes are frequent. In the case of an auxiliary power unit, or other gas turbine engines, the output shaft can be connected to another component such as an electrical generator, a gearbox, a pump, or another shaft (e.g. transmission shafts between twin-engines) via a coupling, for instance. Various types of couplings exist, including lubricated spline couplings often used on quill shafts for instance.

FIG. 2A shows an example of a coupling 30 in accordance with a first embodiment. The coupling 30 can be used to transfer power from a gas turbine engine, such as an auxiliary power unit's output shaft for instance, to another piece of equipment, such as an electrical generator's input shaft, a gearbox or a pump for example. It will be understood that in alternate embodiments, the coupling can be used to couple a wide variety of other pieces of equipment than an auxiliary power unit and an electrical generator, the latter being presented as one possible example use in order to make the following description more tangible and easier to read. In some embodiments, the pieces of equipment can be standalone systems or devices, and in others, the pieces of equipment can be different internal components of a single device or system.

As shown in FIG. 2A, the coupling is formed between two rotary members 32, 34, presented here in the form of shafts, and is used generally for the function of transferring torque from one of the rotary members 32 to the other 34. There can be some degree of misalignment (e.g. angle α) which may need to be accommodated between the axes of these rotary members 32, 34. In this embodiment, a the first rotary member 32 has a female configuration with an axial recess 36 at an end thereof. The recess 36 forms a radially inner-facing surface 38 which will be referred to herein as more concisely as the inner face. The other one of the members 34 has a male configuration and has a radially outer-facing surface, or outer face 40, engaged within the recess 36. The outer face 40 has a smaller diameter than the inner face 38, and a spacing 42 is present between the two faces 38, 40. The male member 34 can extend concentrically to the female member 32, inside the recess. A plurality of circumferentially arranged links 44 occupy the spacing 42. Each link 44 has a (radially) inner end 46 connected to the inner face 40, and a (radially) outer end 48 connected to the outer face 38. The connections prevent the corresponding ends 46, 48 from sliding along the surface 38, 40 they are connected to, and thereby fix the relative circumferential position between the corresponding link end 46, 48 and member surface 38, 40. The connection can be pivotal, rigid, or pivotal with a partial rigidity. Different types of connections can be used in different embodiments. Depending of the exact choice of connection type, the link-receiving connections formed in the inner face and the outer face can involve a corresponding form of irregularity in the surface geometry. The irregularity can be in the form of a seat such as a protrusion, recess, or other shape complementary to the shape of the corresponding end, or in the form of a slot or hole to receive a pivot pin, to name some possible examples. The links 44 extend obliquely, in the sense that the general orientation L of their length between the two ends 46, 48 is inclined, or slanted, e.g. by angle β, from the radial orientation R. In other words, the outer end of each link is circumferentially offset from the link's inner end by an arc A.

The rotary member which is the source of the torque can be referred to as the driver member, whereas the one receiving the torque can be referred to as the driven member. In this embodiment, the driver member is the female member 32, and the driven member is the male member 34, but it will be understood that in another embodiment, the male member 34 can be the driving member. The links 44 are configured to work in compression during torque-transfer operation, and transfer torque by a combination of their compression stress (there can also be some degree of bending stress if the connection is not purely pivotal) and of their inclination/obliqueness β. In an embodiment where the female member 32 is the driving member, the inner end 46 of each link 44 will be circumferentially offset from the corresponding outer end 48 in the direction of the torque T, which results in compressing the links. In an alternate embodiment where the male member is the driving member, an example of which is presented at FIG. 2B, the outer ends 148 of the links 144 would instead be circumferentially offset from the corresponding inner ends 146 in the direction of application of the torque T, which would also result in compressing the links during torque transfer. Accordingly, the direction in which the inner ends 46, 146 are circumferentially offset from the outer ends 48, 148 can be selected as a function of the orientation of the torque T, and of whether the female member 32 or the male member 34 is the driving member, with the goal of subjecting the links to compression during torque transfer.

Returning to FIG. 2A, the links 44 can be configured in a manner to operate collectively, but as independent bodies from the point of view of stress gradients. The links can be separate individual components, mechanically connected to one another only indirectly, via the male 34 and female 32 members. By operating partially or fully in compression, and by being shaped and sized appropriately, they can each independently transfer a portion of the torque, without individually imparting shear or tensile stress into an adjacent link. They can be relatively slender (i.e. thin in the orientation normal to their length in a transverse plane), which can allow them to elastically deform to a greater extent than thicker components, or than a component forming a full annulus. This can contribute in accommodating a satisfactory degree of axial misalignment α between the male member 32 and the female member 34. Moreover, the links 44 can have an axial dimension, referred to herein as width W, which is significant relative to their length, such as in the same order of magnitude, similar or greater dimensions, to spread the compressive force along the width W. Spreading a given amount of compressive force (stemming from a given amount of torque T) along a greater width W, can limit the compressive force density, and allow a greater amount of torsion between the two axially opposite sides. In some embodiments, the torsion deformation capability of the links can be harnessed to accommodate misalignment. The width W can be significantly greater than the thickness, for instance. The coupling 30 can be designed in a manner for the full width to remain in contact with both members 32, 34 due to deformation. The links 44 can accommodate misalignment by deformation rather than by displacement relative to the members, which can be favorable from the point of view of wear resistance. In other embodiments it can be preferred to reduce the width W as much as possible in a manner to reduce weight, for instance.

Figure 3:
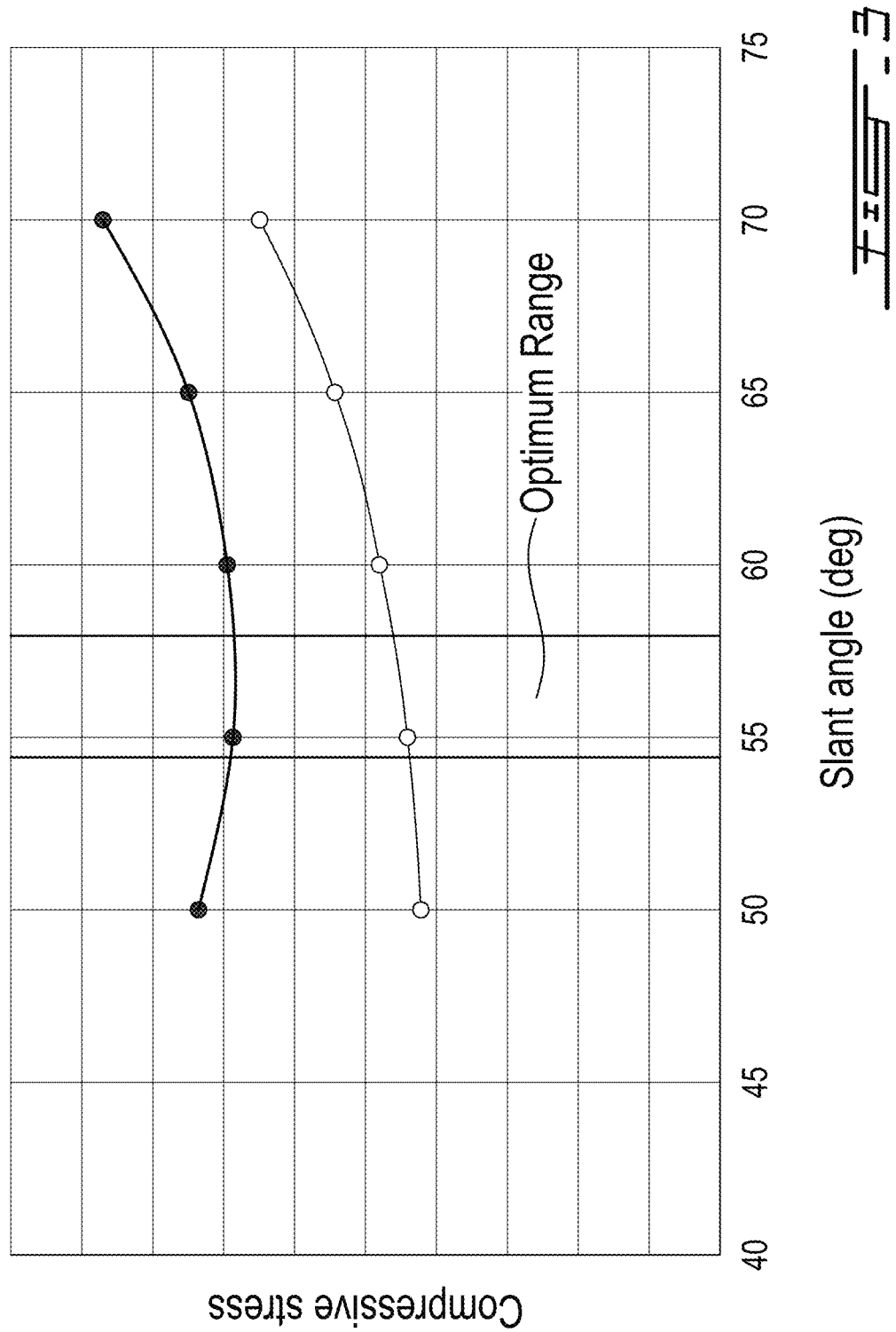
FIG. 3 is a graph plotting compressive stress as a function of slant angle.

The slant angle β can also affect the density of the compressive stress. In one embodiment, it can be preferred to optimize the slant angle β in a manner to minimize compressive stress density. FIG. 3 plots the results of a simulation for compressive stress (y axis) against slant angle (x axis) for an example embodiment such as presented in FIG. 2A, where compressive stress at the outer face 38 is presented by the upper curve, and compressive stress at the inner face 40 is presented by the bottom curve. In a scenario where it is also preferred to limit backlash to within 2 degrees, it can be preferred to select a slant angle of between 52 and 60 degrees measured from the outer pitch diameter tangent, with the range of between 54 and 58 degrees being more preferred in some embodiments. The ideal slant angle can be of 55 degrees in one embodiment, for instance. In other words, when measured from the radial orientation, the angle β can be of between 30 and 38 degrees, preferably between 32 and 36, or about 35 degrees.

In some embodiments, connections which allow for pivoting of the links around one or both ends can be preferred, whereas in other embodiments, non-pivotal, or partially pivoting connections which cause bending deformation in the link in addition to compressive stress can be preferred. The connections which are part of the male member can be referred to as the male member connections and the connections which are part of the female member can be referred to as the female member connections for simplicity.

In the example presented in FIG. 2A, pivotal connections were preferred. In the specific embodiment presented in FIG. 2, the pivotal connections were achieved via engagement between rounded ends of the links 44 and matching connections 50, 52 in the form of rounded sockets in the inner surface 40 and outer surface 38. In an alternate embodiment, for instance, the pivotal connection can be achieved via an axially protruding pin in each one of the ends, and a corresponding slot to receive the pin tips on both axial sides of the link, for instance. In still another embodiment, the connections can be provided in the form of rounded protrusions formed in the corresponding one, or both, of the inner face and the outer face, and a rounded recess of a matching shape can be formed in the corresponding end or ends of the link, thereby inversing the male/female roles, to name another possible example. This being said, the pivotal connection configuration selected for the embodiment of FIG. 2A can provide suitable performance, and may be interesting for other reasons as well. In an alternate embodiment having non-pivotal connections, the socket can be square rather than rounded, for instance.

While the example coupling 30 may be useful and satisfactory in many embodiments, as it may provide satisfactory endurance and load transmission under high temperature and/or high rotation speed operation conditions, conditions of large geometrical mismatch, or conditions where cooling and/or lubrication may not be available, it may be considered as having some inconveniences in other embodiments. In particular, the providing of the links 44 as a set of loose parts may represent either one or both of an undesirable amount of manufacturing costs and an undesired level of assembly complexity in some embodiments. Accordingly, the example coupling 30 may leave a want for improvement in terms of productivity, cost, and/or maintenance, installation an/or operation simplicity in some embodiments. It may also be desired to allow a modification of dynamic characteristics such as torsional stiffness and internal torsional damping.

FIG. 4 shows a second example of a coupling 230. The coupling 230 can be used to transfer power between pieces of equipment in various scenarios, such as scenarios exposed above in relation with the first example coupling 30, and may be better adapted than the first example coupling 30 in some conditions of operation.

The coupling 230 can formed between two rotary members 232, 234, which can be shafts such as illustrated in FIG. 2B, and be used generally for the function of transferring torque from one of the rotary members 232 to the other 234. There can be some degree of misalignment (e.g. angle α) which may need to be accommodated between the axes of these rotary members 232, 234, as explained above. In this embodiment, a the first rotary member 232 has a female configuration with an axial recess at an end thereof. The recess forms a radially inner-facing surface 238 which will be referred to herein as more concisely as the inner face. The other one of the members 234 has a male configuration and has a radially outer-facing surface, or outer face 240, engaged within the recess. The outer face 240 has a smaller diameter than the inner face 238, and a spacing is present between the two faces 238, 240. However, in this example, rather than using a coupling member formed of a plurality of distinct, circumferentially arranged links 44 occupying the spacing 42, a coupling member 231 is formed of a strip 233 having a number of bends which will be referred to herein as folds.

More specifically, in this embodiment, a strip 233 can be provided with a number of folds 260, 262 along its length. The strip 233, with its folds 260, 262, can be arranged in a generally annular configuration around the axis 264. The folds alternate, in the circumferential orientation (or along the length of the strip 233), between radially-outward oriented folds (referred to herein as outer folds 260) and radially-inward oriented folds (referred to herein as inner folds 262). The outer folds 260 are connected to the female member 232 via respective ones of the female member connections 266, and the inner folds 260 are connected to the male member 234 via respective ones of the male member connections 268. In this embodiment, straight segments 270 are provided. Each straight segment 270 interconnects a respective outer fold 260 and an adjacent inner fold 262. More specifically, the strip has a repeating sequence of a first straight segment, a first curved segment forming an outer fold, a second straight segment, and a second curved segment forming an inner fold. Pairs of adjacent straight segments 270 extending from a common inner fold 262 meet along their length, in an between outer folds, and can be in an abutting configuration during operation and collaborate in buckling resistance and force transfer.

In the embodiment illustrated, the strip 233 has a constant thickness, the outer folds 260 are arch-shaped, and broader than the inner folds 262. The outer folds 260 and protruding straight segments 270 generally form a teardrop fold with internal cavity having a teardrop cross-sectional shape. The inner folds 262 can also have an internal cavity associated to a bending radius, which may be significantly smaller than the internal cavity associated to the outer folds 260. The internal cavities in the inner folds 262 may have a circular or teardrop cross-sectional shape. The internal cavity in the inner folds 262 can be less than 10 times, less than 20 times, and even less than 50 or 100 times the size of the internal cavities in the outer folds 260. The outer folds 260 can have a bending radius more than twice, more than three times, more than five times and even more than 10 times the size of the bending radius of the inner folds 262.

Generally, the strip 233 can be said to form a plurality of radially-outward oriented lobes. The lobes can have an orientation which is slanted relative to a radial orientation, similarly to how the links 44 of the first example embodiment can be slanted relative the radial orientation. More specifically, the outer folds 260 can be circumferentially offset from corresponding ones of the inner folds 262. Moreover, in the illustrated embodiment, the female member connections 266 and the male member connections 268 are configured similarly to the way they were configured in the first example embodiment. The straight segments 270 can work in compression by controlled buckling under load. The buckling modes of two adjacent straight segments 270 can be different because of the offset in length, and the difference in buckling mode geometry can allow reciprocal support. The bending radius of the outer folds 260 can correspond to the curved socket geometry of the female member 232, whereas the bending radius of the inner folds 262 can correspond to the curved socket geometry of the male member 234. The strip 233 may be elastically curved into the annular shape from a linear free state, for instance, while still conserving the bending radius.

The connections can prevent the corresponding folds 260, 262 from sliding along the surface 238, 240 they are connected to, and thereby fix the relative circumferential position between the corresponding folds 260, 262 and member surface 238, 240. The connection can be pivotal, rigid, or pivotal with a partial rigidity. Different types of connections can be used in different embodiments. Depending of the exact choice of connection type, the connections formed in the inner face and the outer face can involve a corresponding form of irregularity in the surface geometry. The irregularity can be in the form of a seat such as a protrusion, recess (e.g. socket), or other shape complementary to the shape of the corresponding end, or in the form of a slot or hole to receive a pivot pin, to name some possible examples. The lobes extend obliquely, in the sense that the general orientation L of their length between the outer fold and radially inner end is inclined, or slanted, e.g. by angle $\beta$, from the radial orientation R. In other words, the outer end of each lobe is circumferentially offset from the lobe's inner end by an arc A.

The rotary member 232, 234 which is the source of the torque can be referred to as the driver member, whereas the one receiving the torque can be referred to as the driven member. In this embodiment, the driver member is the female member 232, and the driven member is the male member 234, but it will be understood that in another embodiment, the male member 234 can be the driving member. The pairs of adjacent straight members 270 are configured to work in compression during torque-transfer operation, and transfer torque by a combination of the compression stress (there can also be some degree of bending stress, e.g. if the connection is not purely pivotal) and of their inclination/obliqueness $\beta$. In an embodiment where the female member 232 is the driving member, the inner fold 262 of each lobe will be circumferentially offset from the corresponding outer fold 260 in the direction of the torque T, which results in compressing the lobes during operation. In an alternate embodiment where the male member 234 is the driving member, such as in FIG. 2B, the outer folds 260 of the lobes would instead be circumferentially offset from the corresponding inner folds 262 in the direction of application of the torque T, which would also result in compressing the pairs of adjacent straight segments during torque transfer. Accordingly, the direction in which the inner ends 260 are circumferentially offset from the outer folds 260 can be selected as a function of the orientation of the torque T, and of whether the female member 232 or the male member 234 is the driving member, with the goal of subjecting the links to compression during torque transfer.

Returning to FIG. 4, the pairs of adjacent straight segments 270 can be configured in a manner to operate collectively, but as somewhat independent bodies relative to other pairs, from the point of view of stress gradients. More specifically, during operation, there may be zero stress in the middle of the arch forming the outer fold. In some embodiments, a single strip 233 may be used having an open shape with two lengthwisely opposite free ends, and the free ends can be configured to meet to form a middle of an arch at an outer fold for instance. In other embodiments, the coupling member may be formed of more than one strip, and each one of the strips can have ends meeting ends of adjacent strips in the middle of an arch or outer fold for instance. In other embodiments, the coupling member may be formed of a single strip having two opposite ends bonded or otherwise secured to one another, or of a plurality of strips having ends secured to one another to form an overall loop.

By operating partially or fully in compression, and by being shaped and sized appropriately, the pairs of adjacent straight segments 270 can each independently transfer a portion of the torque, without individually imparting shear or tensile stress into an adjacent pair of straight segments. They can be relatively slender (i.e. thin in the orientation normal to their length in a transverse plane), which can allow them to elastically deform to a greater extent than thicker components, or than a component forming a full annulus. This can contribute in accommodating a satisfactory degree of axial misalignment $\alpha$ between the male member 232 and the female member 234. Moreover, the pairs of adjacent straight segments 270 can have an axial dimension, referred to herein as width W, which is significant relative to their radial dimension (or length), such as in the same order of magnitude, similar or greater dimensions, to spread the compressive force along the width W. Spreading a given amount of compressive force (stemming from a given amount of torque T) along a greater width W, can limit the compressive force density, and allow a greater amount of torsion between the two axially opposite sides. In some embodiments, the torsion deformation capability of the lobes can be harnessed to accommodate misalignment. The width W can be significantly greater than the circumferential dimension, or thickness, for instance. The coupling 230 can be designed in a manner for the full width to remain in contact with both members 232, 234 due to deformation. The lobes can accommodate misalignment by deformation rather than by displacement relative to the members, which can be favorable from the point of view of wear resistance. In other embodiments it can be preferred to reduce the width W in a manner to reduce weight, for instance.

In some embodiments, an even greater degree of axial misalignment may be accommodated by selecting, for the material of the strip, a material having a Young's modulus significantly lower (e.g. 50% less, 100% less, 500% less or even more) than the Young's modulus of the material forming the male and female members 232, 234. For instance, in a scenario where the male and female members 232, 234 are made of steel, the links can be made of a suitable plastic. A plastic material with greater viscoelastic behavior can be preferred to accommodate rapid overload, but may be less performant in terms of recovery factor at slower loading rates. The ultimate choice can be left to the designer of a specific embodiment. Polyimide plastic materials such as Vespel™ can constitute an interesting candidate due to features such as heat resistance, and can have a Young's modulus two degrees or magnitude lower (~100 times lower) than the Young's modulus of steel. Depending on the embodiment, other materials can be selected, such as other plastics, structured materials like metal foams, aerogels, and 3D-printed un-isotropic metal lattices which provide a low apparent Young modulus and even be more suitable at higher temperature environments. Similarly, lower cost plastics than Vespel™ may be preferred in lower temperature environments.

Another potential reason for selecting a different material for the strip 233 than for the male and female members 232, 234 is that it can be preferred for the material of the strip 233 to have a greater coefficient of thermal expansion than the coefficient of thermal expansion of the male and female members. Indeed, in cases where the typical operation temperature range of the coupling is significantly above ambient temperature/standard atmospheric conditions, having a greater coefficient of thermal expansion can simplify assembly. Indeed, the length of the links can be designed to be shorter that the distance between the members which they are designed to occupy during operation conditions. Accordingly, the links can be inserted easily into the spacing, with some degree of play allowed at, say, 20° C., and be designed to grow and extend as the temperature rises during normal operation, in a manner to stabilize in an equilibrium configuration where the combination of thermal growth and deformation from mechanical stress lead to maintaining a given design slant angle $\beta$ at a given set of conditions of torque and temperature, and depart from this target slant angle within set tolerances as the torque and temperature vary within the operation envelope. Similarly, and the thermal "shrinking" can be harnessed at disassembly, to avoid the phenomena of worn parts becoming "hooked" onto others, especially in blind assemblies.

The slant angle $\beta$ can also affect the density of the compressive stress. In one embodiment, it can be preferred to optimize the slant angle $\beta$ in a manner to minimize compressive stress density. FIG. 3 plots the results of a simulation for compressive stress (y axis) against slant angle (x axis) for an example embodiment such as presented in FIG. 2A, where compressive stress at the outer face 38 is presented by the upper curve, and compressive stress at the inner face 40 is presented by the bottom curve. A similar relationship between compressive stress and slant angle may be present for an embodiment based on a strip rather than a plurality of links. In a scenario where it is also preferred to limit backlash to within 2 degrees, it can be preferred to select a slant angle of between 52 and 60 degrees measured from the outer pitch diameter tangent, with the range of between 54 and 58 degrees being more preferred in some embodiments. The ideal slant angle can be of 55 degrees in one embodiment, for instance. In other words, when measured from the radial orientation, the angle $\beta$ can be of between 30 and 38 degrees, preferably between 32 and 36, and ideally of about 35 degrees.

In some embodiments, connections 266, 268 which allow for pivoting of the folds 260, 262 around one or both ends can be preferred, whereas in other embodiments, non-pivotal, or partially pivoting connections which cause bending deformation in the lobe in addition to compressive stress can be preferred. The connections which are part of the male member 234 can be referred to as the male member connections 268 and the connections which are part of the female member 232 can be referred to as the female member connections 266 for simplicity.

In the example presented in FIG. 4, pivotal connections were preferred. In the specific embodiment presented in FIG. 4, the pivotal connections were achieved via engagement between rounded ends of the folds 260, 262 and matching connections 266, 268 in the form of rounded recesses forming sockets in the inner surface 240 and outer surface 238. In an alternate embodiment, for instance, the pivotal connection can be achieved via an axially protruding pin in each one of the ends, and a corresponding slot to receive the pin tips on both axial sides of the link, for instance. In still another embodiment, the connections can be provided in the form of rounded protrusions formed in the corresponding one, or both, of the inner face and the outer face, and a rounded recess of a matching shape can be formed in the corresponding end or ends of the link, thereby inversing the male/female roles, to name another possible example. This being said, the pivotal connection configuration selected for the embodiment of FIG. 4 can provide suitable performance, and may be interesting for other reasons as well. In an alternate embodiment having non-pivotal connections, the socket can be square rather than rounded, for instance.

In one example, the strip may be formed of a flat band of material which is then plastically formed into a corrugated shape, and the corrugated shape can then be elastically folded and arranged into a generally annular geometry. The flat band can be formed into a corrugated shape by various forming processes, such as forming in a press or forming by rotary moulds sometimes referred to as "gears". An example of a moulding process is presented in FIG. 6 where two rotary forming gears 312, 314 are provided with mating external shapes forming moulds. The band of material exhibiting plastic deformability may be spun on a feeding spool 316 and fed into the forming gears 312, 314. The material is released off the spool and passes continuously between two forming gears 312, 314, which gears imprint the respective bending radiuses and straighten the material into straight segments as it is rolled between the forming teeth flanks. The geometry of tooth flank may be cycloidal to make adjacent teeth roll over each other like laminating rollers. The resulting corrugated strip 318 can have alternating summits and valleys. The summits and valleys can be folded into the outer folds and inner folds, respectively. The resulting corrugated strip 318 may be left in the free state or constrained to some length in either linear state or cut and pre-rolled in the functional state. Further, the strip 318 may be subject to thermal treatment as appropriate for the material. Depending on the embodiment, the material of the strip 318 may be a plastic, a metal or a composite. An example of a metal is steel in an annealed state for instance. If the strip is made of a plastic or a composite, in some embodiments, it may be fed between the forming gears in an uncured state, and cured subsequently to forming with the forming gears 314, 312 for instance. One or more strip segments may be so formed and then arranged into an annular geometry and engaged into position between the male rotary member 234 and the female rotary member 232.

Figure 7:
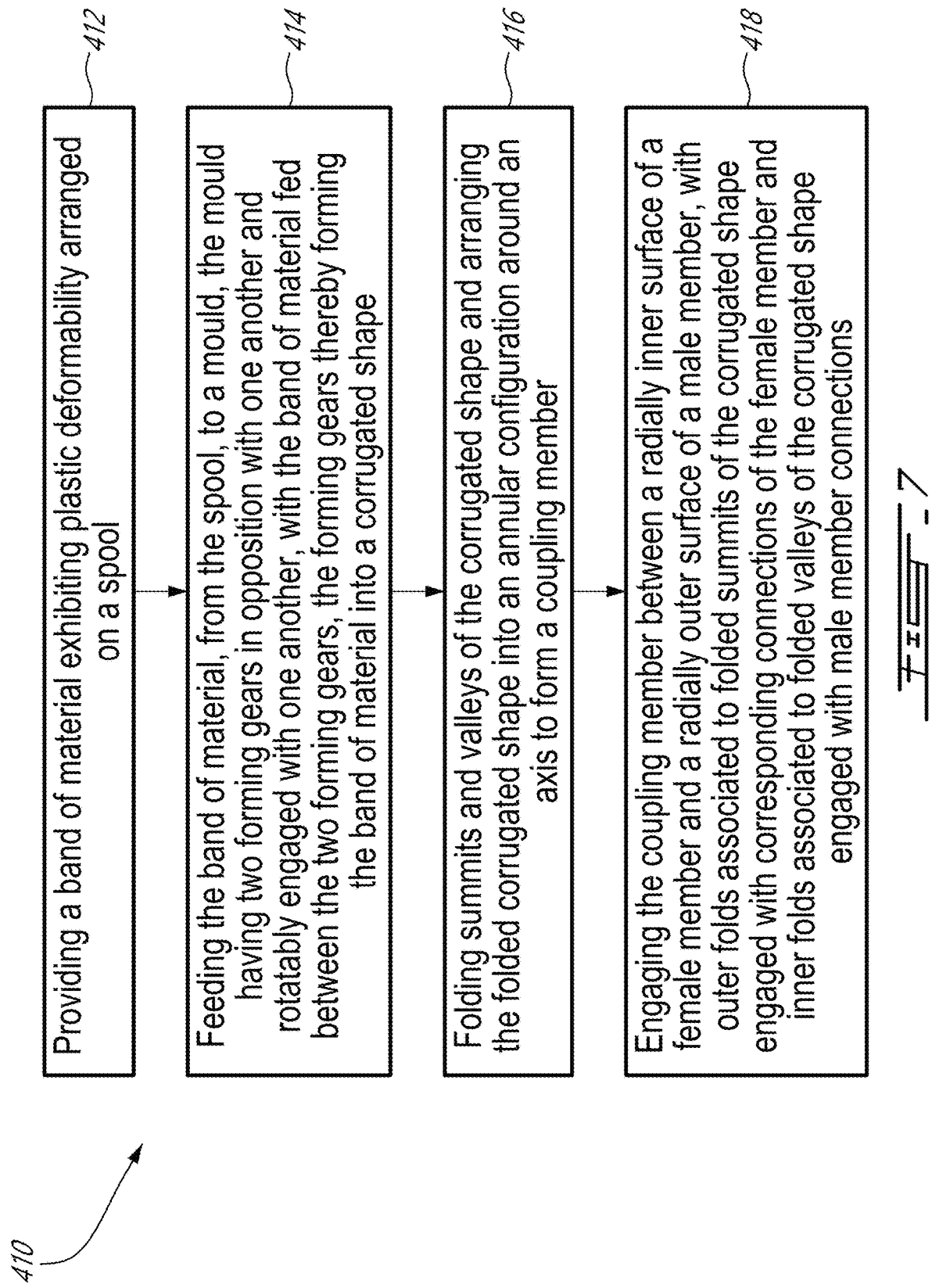
FIG. 7 is a flow chart of a process of forming a strip.

Referring to FIG. 7, a flow chart of an example method 410 of making a coupling is presented. The method can include providing 412 a band of material exhibiting plastic deformability arranged on a spool. The method can include feeding 414 the band of material, from the spool, to a mould, the mould having two forming gears in opposition with one another and rotatably engaged with one another, with the band of material fed between the two forming gears, the forming gears thereby forming the band of material into a corrugated shape. The method can include folding 416 summits and valleys of the corrugated shape and arranging the folded corrugated shape into an annular configuration around an axis to form a coupling member. The method can include engaging 418 the coupling member between a radially inner surface of a female member and a radially outer surface of a male member, with outer folds associated to folded summits of the corrugated shape engaged with corresponding connections of the female member and inner folds associated to folded valleys of the corrugated shape engaged with male member connections.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the category of couplings targeted may have a very wide field of applications, which field can be extended even more by cutting costs and increasing performance. This type of couplings, may replace lubricated spline couplings such as often on quill shafts. A quill shaft is a component connecting gear boxes to driven auxiliaries (generators, pumps, etc.), turbines to gear boxes, long transmission shafts between twin-engines in VTOL applications, etc. The coupling may allow modification of dynamic characteristic such as but not limited to, torsional stiffness and internal torsional damping. The coupling may be used in any type of application deemed suitable. The corrugated strip may be made of any material deemed suitable. Furthermore, it may or may not be subject to thermal treatment as appropriate for the material. The geometrical details of the corrugated strip (number of adjacent strips, strip thickness, strip width, bending radius, etc.) may be set as deemed suitable by the specific application. The corrugated strip may be left in the free state or constrained to some length in either linear state or cut and pre-rolled in the functional state. Yet further modifications could be implemented by a person of ordinary skill in the art in view of the present disclosure, which modifications would be within the scope of the present technology.

The invention claimed is:

1. A method of making a coupling, the method comprising:
   providing a band of material exhibiting plastic deformability arranged on a spool;
   feeding the band of material, from the spool, to a mould, the mould having two forming gears in opposition with one another and rotatably engaged with one another, with the band of material fed between the two forming gears, the forming gears thereby forming the band of material into a corrugated shape;
   folding summits and valleys of the corrugated shape and arranging the folded corrugated shape into an annular configuration around an axis to form a coupling member; and
   engaging the coupling member between a radially inner surface of a female member and a radially outer surface of a male member, with outer folds associated to folded summits of the corrugated shape engaged with corresponding connections of the female member and inner folds associated to folded valleys of the corrugated shape engaged with male member connections.

2. The method of claim 1 wherein said engaging includes loosely engaging the coupling, the method further comprising subjecting the coupling to a greater thermal growth than the male member and the female member for more tightly engaging the outer folds and inner folds with corresponding connections.

3. The method of claim 1 wherein the band of material is a plastic in an uncured state, further comprising curing the plastic subsequently to said forming the band of material into the corrugated shape.

4. The method of claim 1 further comprising compressing the coupling member between the male member and the female member.

5. The method of claim 1 further comprising pivoting the outer folds in the female member connections and pivoting the inner folds in the male member connections.

* * * * *